June 22, 1926.
K. L. HERRMANN
1,589,883
INTERNAL COMBUSTION ENGINE
Filed August 12, 1925   2 Sheets-Sheet 1
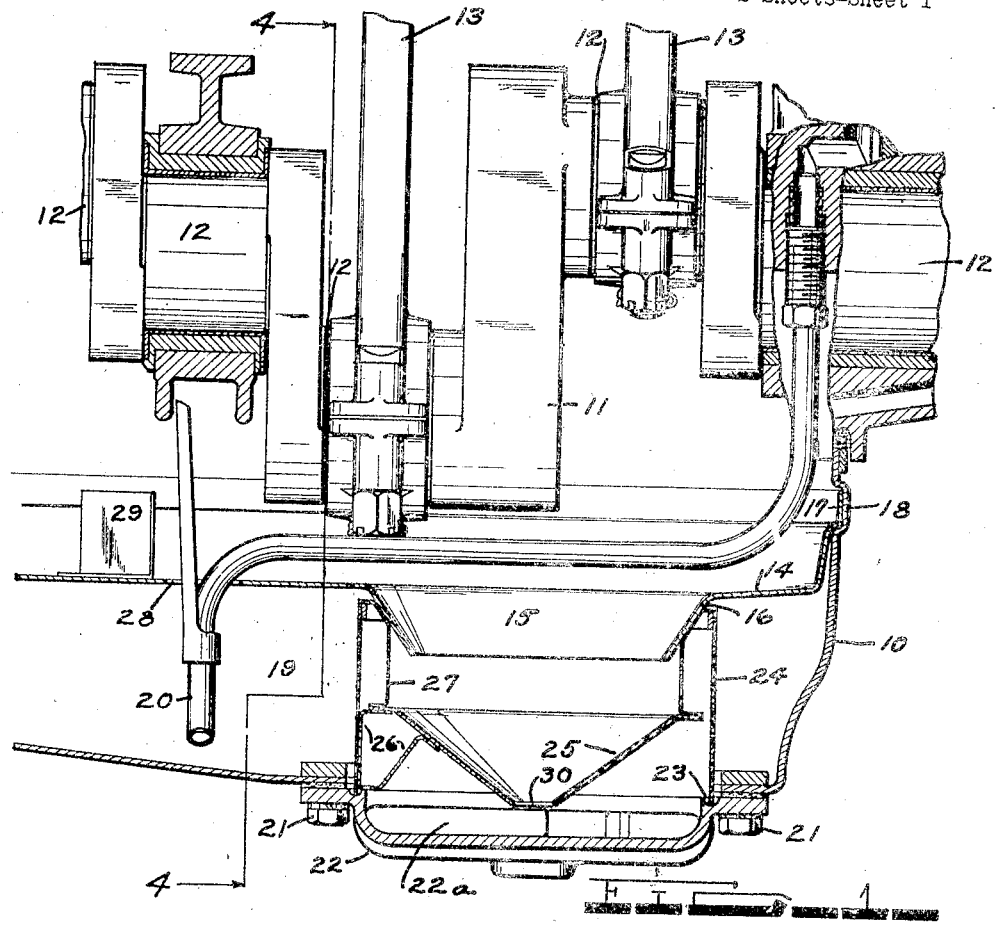
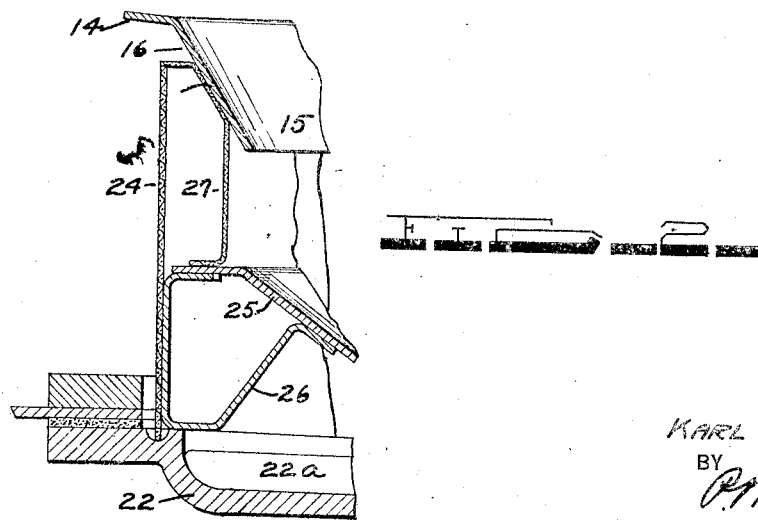
INVENTOR
KARL L. HERRMANN.
BY
ATTORNEY

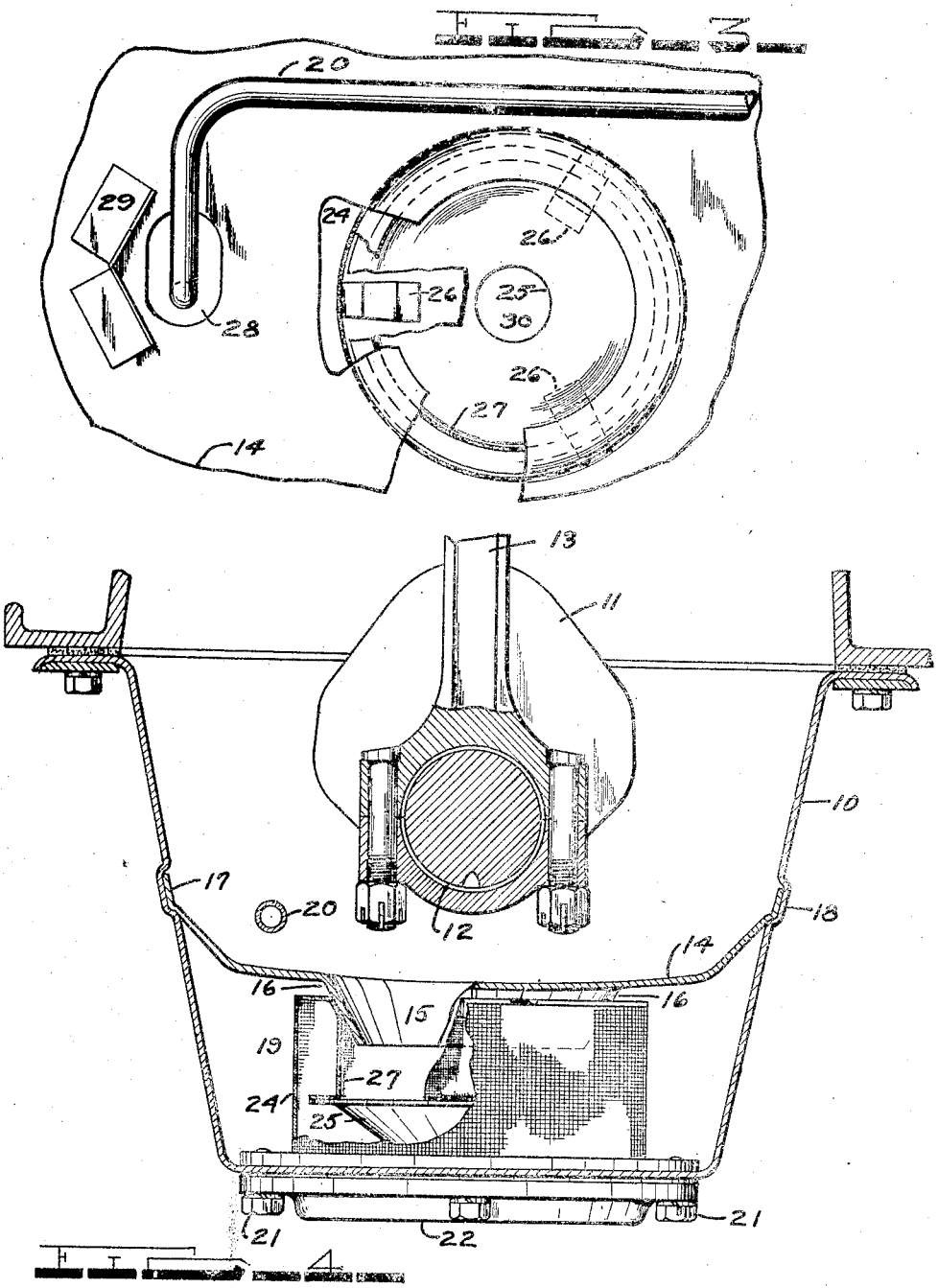

Patented June 22, 1926.

1,589,883

UNITED STATES PATENT OFFICE.

KARL L. HERRMANN, OF DETROIT, MICHIGAN, ASSIGNOR TO THE STUDEBAKER CORPORATION, OF SOUTH BEND, INDIANA, A CORPORATION OF NEW JERSEY.

INTERNAL-COMBUSTION ENGINE.

Application filed August 12, 1925. Serial No. 49,758.

This invention relates to the lubrication of internal combustion engines and more particularly to the construction of oil strainers often used in connection therewith.

It is the practice in internal combustion engines to pump oil from a reservoir, otherwise known as the crankcase, to the bearings of the various movable members and to allow the oil after passing therethrough to drain back into the crankcase. In making this passage the oil picks up considerable sediment such as dirt drawn in through the breather tube, steel dust, fine extremely hard carbon particles and the like, which in most engines is kept constantly agitated, by the force of the fall of oil into the crankcase thereby causing it to be continually flowing with the oil to the bearings and between the pistons and cyclinder walls, increasing the dangers of greater wear, scored cylinder walls, and burned out bearings due to clogging up of the pipe lines and increased friction.

Some engines do embody the use of a screen or strainer positioned in the crankcase, into which the oil flows by gravity from a splash pan positioned above. This does not prevent the oil when the flow is great enough to overflow the strainer from carrying the agitated sediment over the top thereof into the crankcase where it is again picked up by the pump, and has practically no effect on those particles small enough to pass through the screen.

With the above in view, it is the principal object of the present invention to provide an internal combustion engine embodying the use of an oil strainer with means for preventing the lubricating oil from carrying particles of sediment with it in instances when the flow is great enough to cause the oil to overflow the top of the strainer, and to isolate, as far as possible, those particles of sediment or foreign matter which are small enough to pass through the screen.

Another object is to provide an oil strainer for an internal combustion engine with a baffle member to dampen the effect of turbulence of the oil flowing thereinto from the splash pan, thereby inducing precipitation of the sediment and tending to prevent its subsequent clogging of the strainer screen and the carrying of the finer particles through the screen.

A further object is to provide an internal combustion engine with an oil straining device comprising an outer screen and an inner screen of smaller diameter supported on a funnel-shaped member also contained within the outer screen, the whole of which is positioned over a sediment pocket in the bottom of the engine crankcase, and into which oil from the bearings and other parts flows after being used.

These being among the objects of the present invention the same consists of certain features of construction and combination of parts to be hereinafter described with reference to the accompanying drawings and then claimed, having the above and other objects in view.

In the accompanying drawings which illustrate a suitable embodiment of the present invention, and in which like numerals refer to like parts throughout the several views, Figure 1 is a partial sectional view taken longitudinally through the lower part of an internal combustion engine showing the oil strainer and oil splash pan construction of the present invention in combination therewith.

Figure 2 is an enlarged fragmentary sectional view of the oil strainer showing the method of supporting the inner screen and the funnel-shaped baffle.

Figure 3 is a fragmentary top view of the oil splash pan, oil strainer, oil feed pipe and deflector member shown in Figure 1.

Figure 4 is a partial view taken transversely through the engine on the line 4—4 of Figure 1, a portion of the oil strainer being broken away to show the inner construction thereof.

In Figures 1 and 4, a portion of an internal combustion engine is shown as having a crankcase 10, crankshaft 11, bearings 12 and connecting rods 13. Positioned within the crankcase 10 is an oil tray or splash pan 14 which is slightly dish-shaped in form and is provided at one end with an aperture 15 having downwardly sloping or funnel-shaped sides 16. It is suitably held in fixed position by means of its upwardly extending peripheral flange 17 which is sprung into place in the outwardly projecting bead 18 formed around the sides and ends of the crankcase 10.

The lubricating oil is circulated by means of a suitable pump or other device (not shown) which draws the oil up from the reservoir 19 formed by the crankcase 10, through the pipe 20 and forces it into the main bearings 12 and other working parts, from which it drips or passes down to the splash pan 14 and flows down through the aperture 15 into the reservoir 19.

Removably secured to the bottom of the crankcase 10 directly below the aperture 15 in the splash pan 14 by screw bolts 21, is a cover plate 22 forming a relatively deep sediment pocket 22 provided with a narrow annular groove 23 in its upper face.

As previously stated, the oil in flowing through the various working parts of the engine accumulates considerable sediment which at times is extremely hazardous to the bearings, the cylinder walls and the pipe lines, thereby causing greater wear, burned out bearings and scored cylinder walls. To overcome these difficulties the present invention has been provided which comprises a cylindrical screen 24 which seats and is secured in the groove 23 in the plate 22 and extends upwardly adjacent to the bottom of the splash pan 14 and is circumferentially spaced from the sloping side walls 16 of the aperture 15. Circumferentially positioned within and substantially midway in the screen 24 is a funnel-shaped sheet metal baffle member 25 supported by a number of spaced legs 26 which rest on the top surface of the cover plate 22 and are suitably secured to the screen 24 to support the baffle member 25 in spaced relation to the sides of the screen 24 and the cover plate 22. Centrally positioned within the screen 24 and seating on the outwardly flanged horizontal portion of the member 25, is an inner cylindrical screen 27, of smaller diameter and of preferably coarser mesh than the screen 24 having an outwardly tapered upper portion which rests firmly against the outside conical face of the wall 16 of the aperture 15 and which terminates in a horizontally outwardly extending flange portion which engages the upper edge of the screen 24.

To prevent oil from flowing through the opening 28 in the splash pan 14 through which the oil pipe 20 extends into the reservoir 19, a deflector member 29 is provided to cause the oil to flow therearound.

In operation, the level of the oil in the crank-case is preferably about midway between the upper edge of the baffle 25 and the top of the screen 24. When the engine is running the flow of oil from the splash pan 14 through the opening 15 causes the level of the oil in the screens 27 and 24 to rise, thereby creating a head on the oil within the screens 27 and 24 which forces it through the same and out into the oil pan where it is ready to be again picked up by the suction pipe 20 and be carried back to the bearings. As the flow of oil through the opening 15 increases, the force of the flow tends to agitate the oil within the screen 27, and were any sediment unduly exposed to this agitating or turbulent effect of the oil the tendency would be to carry it to the screens and deposit it thereon, or, if it was small enough to carry it through the screens. The inner screen 27 and the baffle 25 is provided to prevent this result, and as the sediment laden oil pours through the opening 15 it strikes the baffle 25 which substantially prevents any further downward movement and deflects it back upward against the screen 27, thus causing a certain amount of turbulence, as the screen 27 is of relatively large area, and of relatively large mesh, most of the oil will pass therethrough into the space between the screen 27 and the screen 24. During this stage of the oil circulation a certain amount of the sediment will be precipitated on to the downwardly sloping walls of the baffle 25 and will work downwardly towards its lower central opening 30 and will be carried therethrough by the smaller and more restricted flow of oil passing through the opening 30. After this sediment carrying oil has passed through the opening 30 to the pocket 22ᵃ below the baffle 25 is will no longer be affected by the turbulency of the oil above the baffle 25, and will become comparatively still and undisturbed, thereby creating an ideal condition for precipitation of the sediment which will drop to the bottom of the pocket 22ᵃ where it will remain undisturbed and will not be thereafter affected by any material turbulency which would tend to pick it up again and return it to the circulating oil.

The flow of the oil that passes through the screen 27 will also be reduced as it enters the enlarged area bounded by the screen 24, and in passing through the screen 27 the turbulent effect will be substantially diminished. This will allow any sediment that has been carried through the screen 27 to precipitate and drop down into the pocket 22ᵃ where, as before described, the oil is comparatively still and undisturbed, and from which there is little possibility that it will again be picked up and carried into the circulating system. The oil, then, that finally passes out through the screen 24 into the oil pan 10 will be substantially free of any sediment. From time to time, as the occasion demands or the opportunity permits, the cover plate 22 may be removed and the sediment cleaned out of the pocket 22ᵃ.

In extremely cold weather in starting, the oil is very apt to be thick and heavy and will not readily flow through the screens 24 and 27 and in this case it will back up into the splash pan 14 and flow down through the opening 28 around the pipe 20 until it is warmed up sufficiently to flow through the screens 24 and 27.

From the foregoing description it can be plainly seen that such an oil strainer will be very efficient in isolating the sediment from the lubricating oil and thereby provides a very efficient and desirable construction.

Formal changes may be made in the specific embodiment of the invention described without departing from the spirit and substance of the broad invention, the scope of which is commensurate with the appended claims.

What I claim is:—

1. In an internal combustion engine, the combination with an oil pan and a splash pan, of an oil strainer mounted on said oil pan for receiving oil from said splash pan comprising inner and outer vertically extending spaced screen members, a perforated funnel-shaped baffle closing the lower end of said inner screen, and a sediment pocket positioned below said baffle and said inner screen.

2. In an internal combustion engine, the combination with an oil pan and a splash pan, of an oil strainer for receiving oil to be strained from said splash pan comprising inner and outer vertically extending spaced screen members, a baffle provided with a relatively small central opening closing the lower end of said inner screen, means for spacing said baffle from the bottom of said oil pan, and a sediment pocket positioned below said opening.

3. In an internal combustion engine, the combination with an oil pan having a sediment pocket and a splash pan, of an oil strainer for receiving oil from said splash pan comprising an outer screen positioned over said sediment pocket, a perforated baffle member within said screen, legs for supporting the same therein, and an inner screen supported by said baffle member.

4. In combination with an internal combustion engine having an oil pan and an oil splash pan, an oil strainer for receiving oil from said splash pan comprising outer and inner vertically spaced screen members, a sheet metal baffle member provided with a relatively small central opening, and a plurality of legs extending upwardly from the bottom of said oil pan to support and hold said baffle in spaced relation thereto.

5. In an internal combustion engine, the combination with an oil pan, of an oil strainer to strain the oil used by said engine comprising vertically extending inner and outer screen members, a sheet metal baffle member provided with downwardly converging side walls terminating in a relatively small central opening closing the lower end of said inner screen, and a sediment pocket positioned below said opening to catch sediment precipitating out of said oil.

6. In an internal combustion engine, the combination with an oil pan and a splash pan provided with a discharge opening having downwardly flanged edges, of an oil strainer for receiving oil from said splash pan through said opening comprising inner and outer vertical screen members, said inner screen member contacting against said flanged edges of said opening and said outer screen spaced around but out of contact with said flanged edges.

7. In an internal combustion engine, the combination with an oil pan a splash pan provided with a discharge opening having downwardly flanged edges, of an oil strainer for receiving oil from said splash pan through said opening, comprising outer and inner vertically extending screen members and a perforated baffle member, said outer screen extending around and out of contact with said flanged edges of said opening, and said inner screen contacting against said edges and flanging outwardly to contact with and be secured to the upper edge of said outer screen.

8. In an internal combustion engine, the combination with an oil pan and a splash pan, of an oil strainer for receiving oil from said splash pan comprising inner and outer vertically extending spaced screen members and a perforated sheet metal baffle member closing the lower end of said inner screen, an opening in the bottom of said oil pan below said screens, and a cover for said opening providing a relatively deep sediment pocket.

9. In an internal combustion engine, the combination with an oil pan and a splash pan, of an oil strainer for receiving oil from said splash pan comprising inner and outer vertical screens and a baffle member having sloping sides and a central opening, positioned below and contacting with said inner screen, an opening in said oil pan below said baffle member, and a cap for said opening, said screens and baffle being removable through said opening as a unit.

Signed by me at Detroit, Michigan, U. S. A., this 7th day of August, 1925.

KARL L. HERRMANN.